(12) United States Patent
Lawson et al.

(10) Patent No.: US 7,621,311 B2
(45) Date of Patent: Nov. 24, 2009

(54) TIRE-WHEEL ASSEMBLY ADJUSTER

(75) Inventors: Lawrence J. Lawson, Troy, MI (US); John C. Fox, Fraser, MI (US)

(73) Assignee: Android Industries LLC, Auburn Hills, MI (US)

( * ) Notice: Subject to any disclaimer, the term of this patent is extended or adjusted under 35 U.S.C. 154(b) by 229 days.

(21) Appl. No.: 11/543,962

(22) Filed: Oct. 5, 2006

(65) Prior Publication Data

US 2007/0074824 A1 Apr. 5, 2007

Related U.S. Application Data

(60) Provisional application No. 60/723,665, filed on Oct. 5, 2005.

(51) Int. Cl.
*B60C 25/00* (2006.01)
(52) U.S. Cl. .......................................... 157/1.24; 157/1
(58) Field of Classification Search ................. 157/1.1, 157/1.17, 1.2, 1.22, 1.24, 1.26, 1.28; 414/222.04–222.13; 180/168
See application file for complete search history.

(56) References Cited

U.S. PATENT DOCUMENTS

| | | | |
|---|---|---|---|
| 2,546,988 A | 4/1951 | Eberly |
| 2,665,747 A | 1/1954 | Harrison |
| 2,900,017 A | 8/1959 | Lewis |
| 2,900,018 A | 8/1959 | Harrison |
| 2,907,379 A | 10/1959 | Tuttle |
| 2,934,137 A | 4/1960 | Lewis |
| 3,489,198 A | 1/1970 | Malinski |
| 3,545,463 A | 12/1970 | Mueller |
| 3,557,862 A | 1/1971 | Mains |
| 3,791,434 A | 2/1974 | Duquesne et al. |
| 4,093,015 A | 6/1978 | Malinski |
| 4,230,170 A | 10/1980 | Duquesne et al. |
| 4,242,169 A | 12/1980 | DeHaven |
| 4,262,727 A | 4/1981 | Schifferly |
| 4,314,597 A | 2/1982 | Zrostlik et al. |
| 4,403,640 A | 9/1983 | Schifferly |
| 4,420,026 A | 12/1983 | Goiseau et al. |
| 4,425,954 A | 1/1984 | Ogren |
| 4,516,617 A | 5/1985 | Seitz et al. |

(Continued)

FOREIGN PATENT DOCUMENTS

| | | |
|---|---|---|
| EP | 105204 | 4/1984 |
| EP | 530 996 | 3/1993 |

*Primary Examiner*—D. S Meislin
(74) *Attorney, Agent, or Firm*—Honigman Miller Schwarz and Cohn LLP

(57) ABSTRACT

A tire-wheel assembly adjuster is disclosed. The tire-wheel assembly comprises a working assembly adapted to be adjustable along an axis relative a workpiece and a sub-assembly coupled to the working assembly that is adapted to be radially adjustable relative the axis. A method for assembling a tire-wheel assembly is also disclosed. The method includes the steps of providing a tire in an un-mounted state relative a wheel to a tire-wheel assembly adjuster; moving a sub-assembly connected to a working assembly in a radial direction relative an axis; moving the working assembly in a first direction about the axis toward the tire and wheel; and causing a wheel adjuster extending from the sub-assembly to circumferentially seat a bead of the tire into a bead seat of the wheel.

31 Claims, 9 Drawing Sheets

U.S. PATENT DOCUMENTS

| | | | |
|---|---|---|---|
| 4,537,552 A * | 8/1985 | Slee ..................... 414/226.04 |
| 4,606,393 A | 8/1986 | Cuccolini et al. |
| 4,621,671 A | 11/1986 | Kane et al. |
| 4,789,015 A | 12/1988 | Flinn |
| 4,800,944 A | 1/1989 | Kane |
| 4,830,079 A | 5/1989 | Onuma et al. |
| 4,896,712 A | 1/1990 | du Quesne et al. |
| 4,986,328 A | 1/1991 | Metzger et al. |
| 5,067,236 A | 11/1991 | Shifferly |
| 5,094,284 A | 3/1992 | Curcuri |
| 5,141,040 A | 8/1992 | Curcuri |
| 5,170,828 A | 12/1992 | Curcuri |
| 5,222,538 A | 6/1993 | Tomita et al. |
| 5,224,532 A | 7/1993 | Kawabe et al. |
| 5,337,817 A | 8/1994 | Steinbeck et al. |
| 5,339,880 A * | 8/1994 | Kawabe et al. ................. 157/1 |
| 5,582,487 A * | 12/1996 | Teramachi ................... 384/45 |
| 5,649,582 A | 7/1997 | Hjorth-Hansen et al. |
| 5,836,368 A | 11/1998 | Corghi et al. |
| 6,138,737 A | 10/2000 | Bocquet et al. |
| 6,247,516 B1 | 6/2001 | Sinclair |
| 6,463,982 B1 * | 10/2002 | Doan ......................... 157/1.1 |
| 7,044,188 B2 * | 5/2006 | Pellerin et al. ............. 157/1.17 |
| 7,048,026 B2 * | 5/2006 | Bonacini ................... 157/1.28 |
| 2001/0042601 A1 * | 11/2001 | Corghi ....................... 157/1.26 |
| 2003/0012626 A1 * | 1/2003 | Aggarwal ............... 414/217.1 |

* cited by examiner

TIRE-WHEEL ASSEMBLY ADJUSTER

RELATED APPLICATION

This disclosure claims the benefit of Provisional Patent Application No. 60/723,665, filed on Oct. 5, 2005.

FIELD

The disclosure generally relates to devices for mounting, inflating, and balancing a tire relative a wheel and more particularly to a device that adaptably-adjusts a mounting configuration of the device to accommodate differently-sized tires and wheels delivered to the device

BACKGROUND

Tire/wheel assembly facilities may incorporate one or more automated tire/wheel assembly lines for assembling tire/wheel assemblies. This process typically involves, amongst other operations: (a) the mounting of a tire onto a wheel, (b) the inflating of the tire to the desired pressure, and (c) the balancing of the tire/wheel assembly.

Although conventional devices include the benefit of quickly assembling a tire/wheel assembly, such devices may be robust and costly while being limited to mounting a tire having a specified dimension to a wheel having a specified dimension. A need therefore exists for a device, system, and mounting technique that overcomes the shortcomings of the prior art.

BRIEF DESCRIPTION OF THE DRAWINGS

The present disclosure will now be described, by way of example, with reference to the accompanying drawings, in which.

DETAILED DESCRIPTION

A tire-wheel assembly adjuster is shown generally at 100 in FIGS. 1A-1D according to an embodiment. The tire-wheel assembly adjuster 100 provides a simple, quick, and dependable technique for installing a tire 11 having any desirable dimension onto a wheel 13 having a corresponding dimension while reducing the potential for lodging entrapments, such as, for example, air bubbles, lubricant, or the like between a bead of the tire 11 and a bead seat of the wheel 13.

Figure 1A:
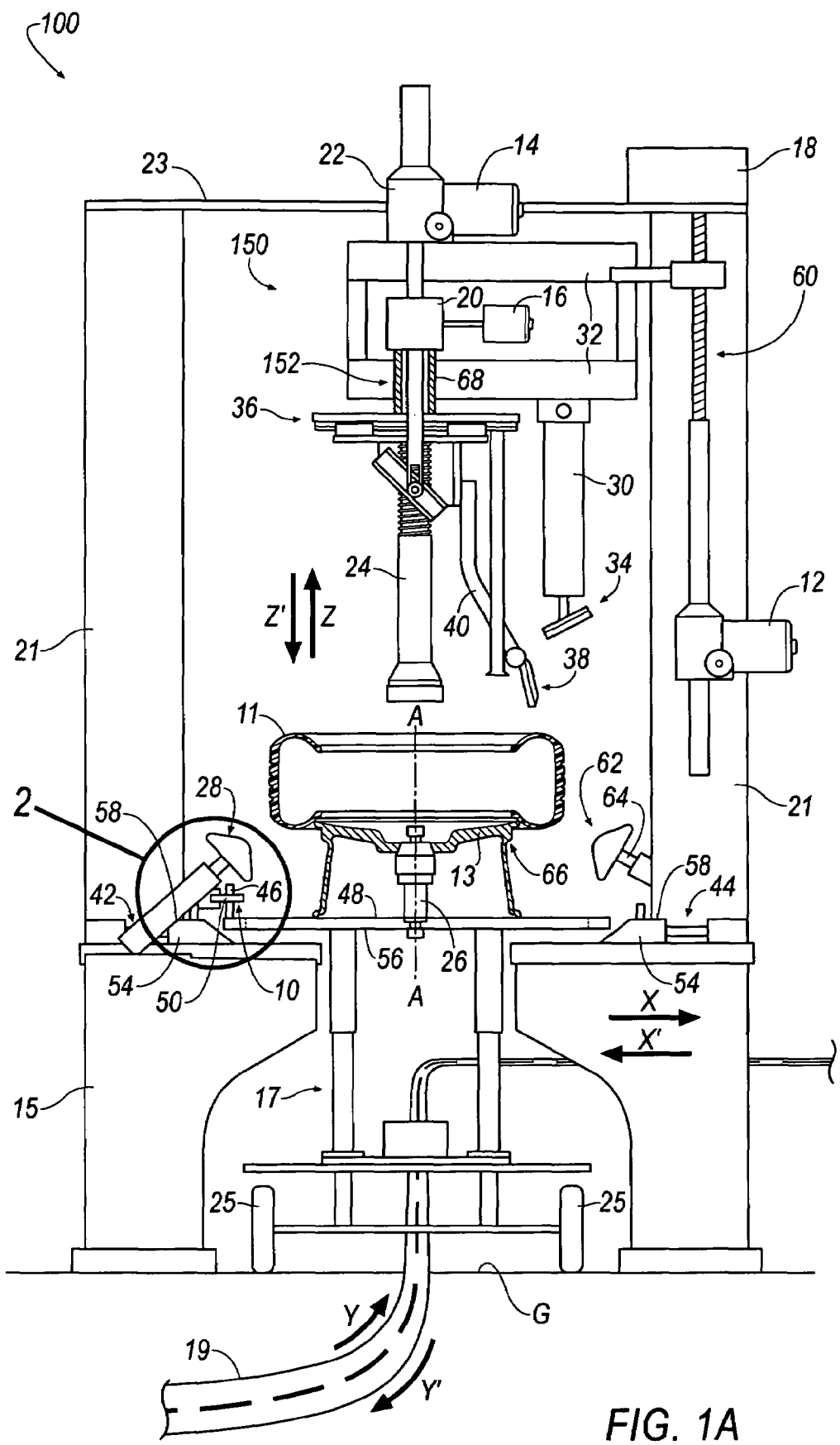
FIGS. 1A-1D illustrate front views of a tire-wheel assembly adjuster according to an embodiment.

First, referring to FIG. 1A, the tire-wheel assembly adjuster 100 generally includes a base portion 15 that is adapted to receive a cart 17 carrying a workpiece (i.e. the tire 11 and wheel 13). The cart 17 is movable along a track 19, which may constitute a portion of an assembly line for mounting, inflating, and balancing the tire 11 relative the wheel 13. As illustrated, the cart 17 may securely interface and dock with the base portion 15 by way of a docking mechanism 10 extending from one of a plurality of vertical supports 21 attached to the base portion 15. Attached to the vertical supports 21 is a horizontal support 23 for supporting a working assembly 150.

Also included with the tire-wheel assembly adjuster 100 is a first motor 12, a second motor 14, a third motor 16, a controller 18, a first transmission 20, a second transmission 22, a first upper spindle 24, a second lower spindle 26, one or more kickers 28, a first ram 30, a platform 32, a head 34, a platen 36, an installation wheel 38, a radial arm 40, and second and third rams 42, 44.

In an embodiment, the tire 11 and wheel 13 can be carried proximate to and located under the tire-wheel assembly adjuster 100 by way of the cart 17. Other means of bringing wheel 13 and tire 11 to a working position with respect to tire-wheel assembly adjuster 100 are well known in the art and include, for example, conveyor belts and the like. When the tire 11 and wheel 13 are first brought into a working position with respect to the tire-wheel assembly adjuster 100, the working assembly 150 is in a raised position (e.g., FIGS. 1A-1B) such that tire 11 and wheel 13 are freely manipulatable below the working assembly 150. Once the cart 17, however, is properly positioned below the working assembly 150, the docking mechanism 10 may be activated, thereby positively fixing the cart 17 in relation to the tire-wheel assembly adjuster 100.

Figure 1B:
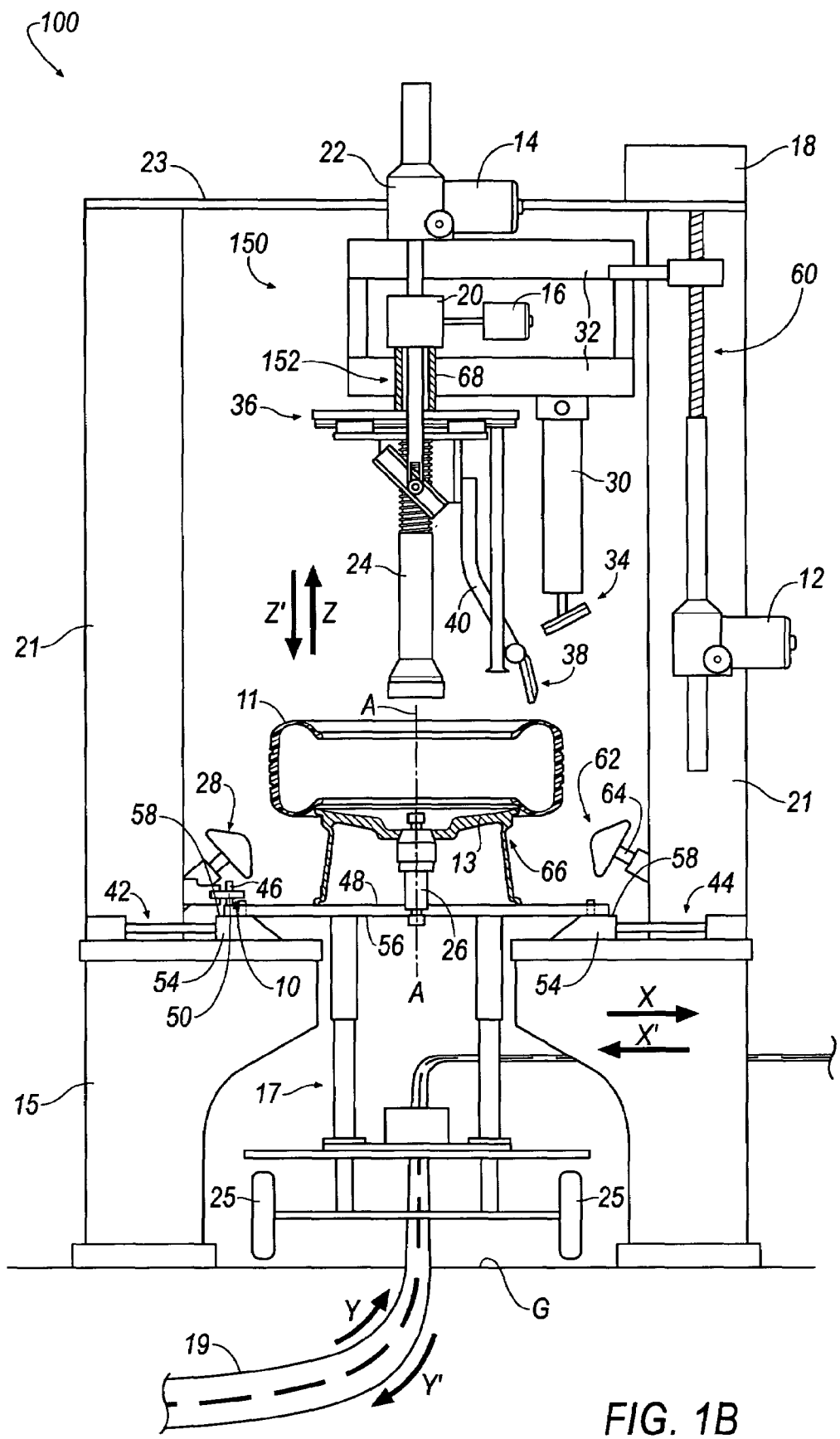
Figure 1C:
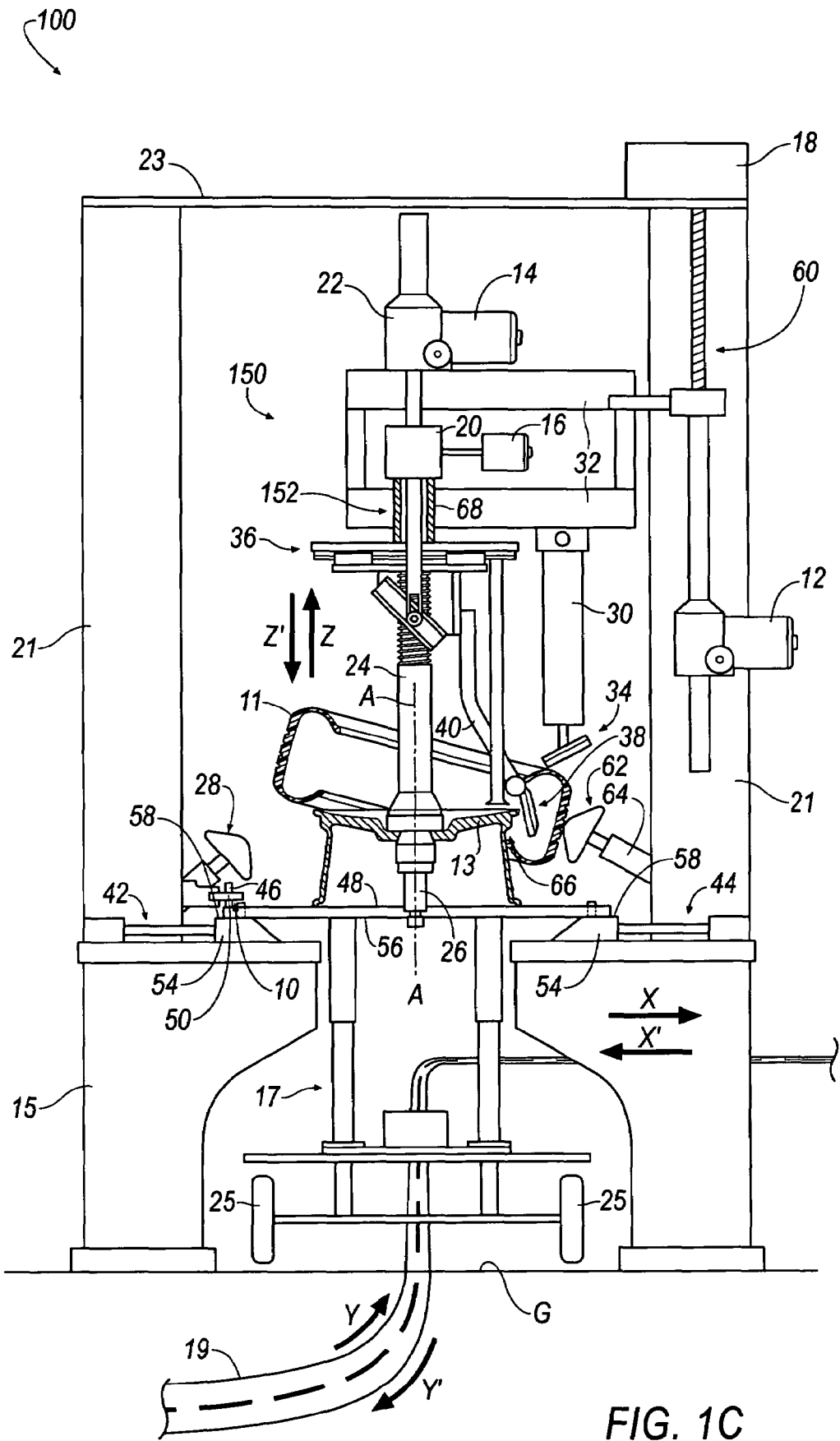
Figure 1D:
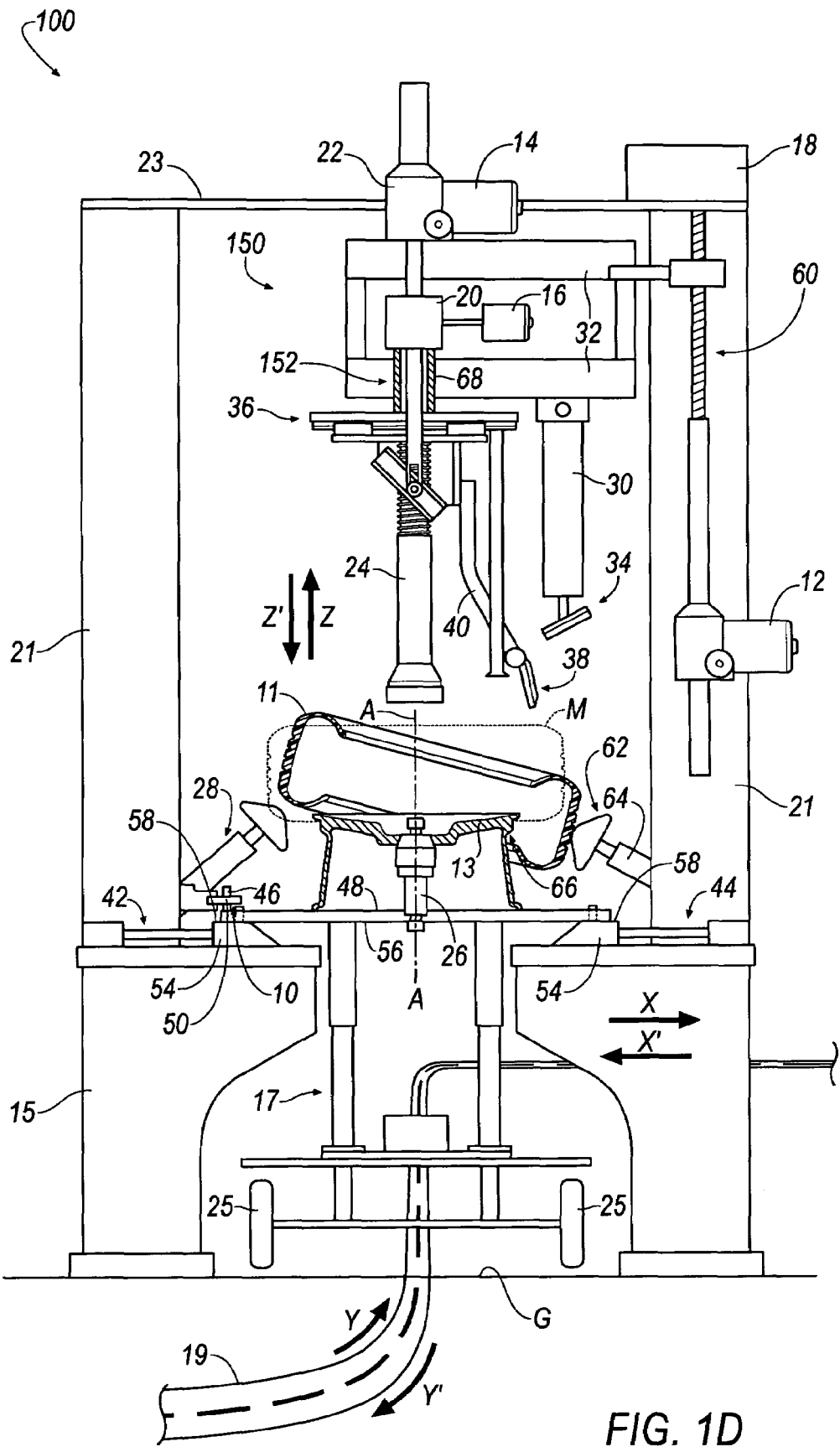
Figure 2A:
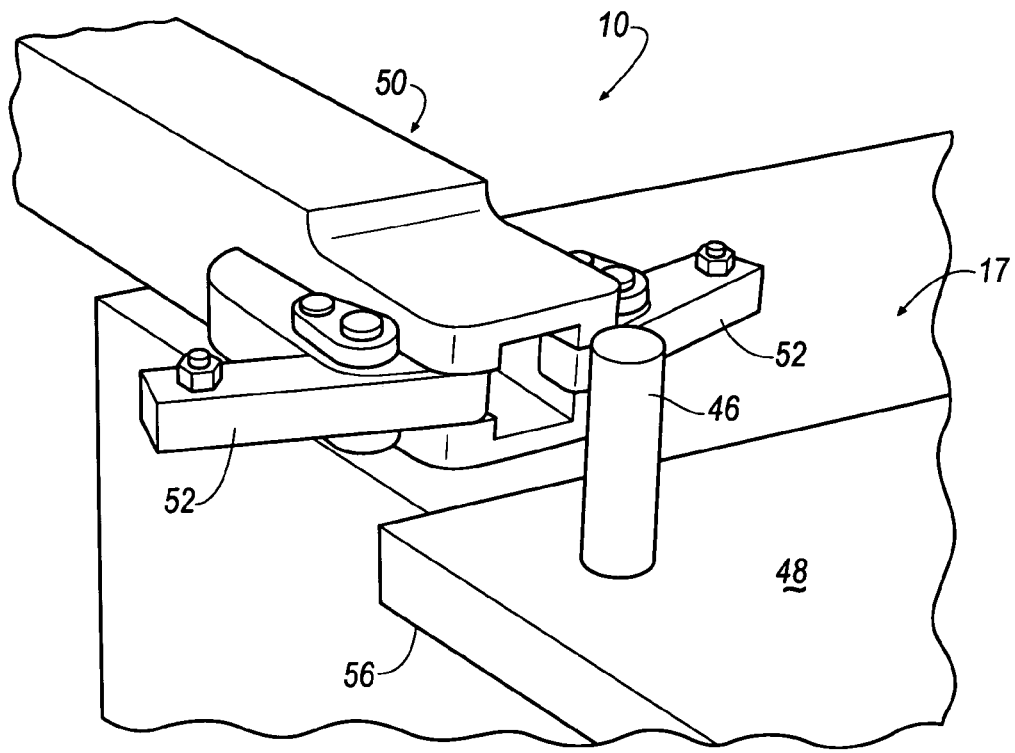
FIG. 2A illustrates a docking mechanism of the tire-wheel assembly adjuster in a first position according to an embodiment.
Figure 2B:
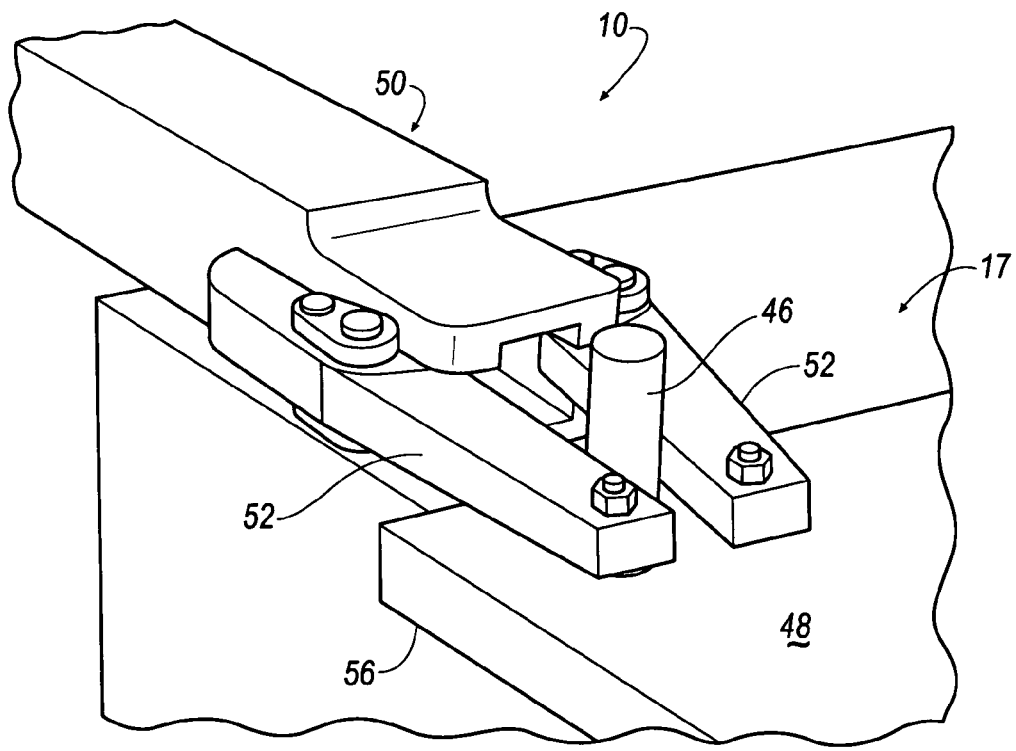
FIG. 2B illustrates a docking mechanism of the tire-wheel assembly adjuster in a second position according to an embodiment.

Referring to FIGS. 2A and 2B, the docking of the cart 17 with the base portion 15 of the tire-wheel assembly adjuster 100 is enabled by way of a pin 46 extending from an upper support surface 48 of the cart 17. The pin 46 is adapted to interface with a gripping claw 50 extending from one of the vertical supports 21. As such, the pin 46 and gripping claw 50 generally defines the docking mechanism 10. Generally, the docking mechanism 10 prevents inadvertent lateral movement(s) of the cart 17 in a direction according to arrows, X, X' (FIGS. 1A-1D) relative the base portion 15, and, a traveling movement along the track 19 according to the direction of the arrows, Y, Y' (FIGS. 1A-1D) during a tire mounting process (FIG. 1C).

As illustrated in FIGS. 2A and 2B, the gripping claw 50 includes a pair of fingers 52 that are manipulatable between an open position (FIG. 2A) and a closed position (FIG. 2B). When the fingers 52 are manipulated in an open position, the cart 17 is free to move about, into, and away from the base portion 15 along the direction of the arrows, X, X', Y, Y' without interference from fingers 52; however, when the fingers 52 are in the closed position, the fingers 52 engage the pin 46 such that cart 17 is not free to move in the direction according to the arrows, X, X', Y, Y'. When the fingers 52, however, are in the clamped position, the operation associated with the installation of the tire 11 onto wheel 13 can take place without any relative movement between the cart 17 and the base portion 15.

It will be appreciated that the fixing of the cart 17 with respect to base portion 15 by way of the docking mechanism 10 may be conducted alone, or, in combination with a procedure including the steps of lowering and mating the upper spindle 24 with the lower spindle 26. As illustrated in FIG. 1C, the lower spindle 26 is attached to and extends through the wheel 13 from the upper support surface 48 of the cart 17, thereby fixing the relationship of the cart 17 relative the base 15.

Referring now to FIG. 1A, once the cart 17 is secured to the base portion 15, the second and third rams 42, 44 are activated to cause respective wedge portions 54 of the rams 42, 44 to slide toward a central axis, A-A, and underneath a rear side 56 of the support surface 48 such that a top surface 58 of the wedge portions 54 engages the rear side 56, as shown in FIG. 1B. As the wedge portions 54 engage the rear side 56, the cart 17 is raised according to the direction of the arrow, Z, as the pin 46 is axially moved, according to the movement of the cart 17 in the direction of the arrow, Z, as the fingers 52 of the gripping claw 50 remain fixed in place and continue to engage the pin 46. Accordingly, as shown in FIG. 1B, the combination of the positioning of the docking mechanism 10 along with the raising of wheels 25 of the cart 17 away from a support surface or ground, G, substantially isolates the cart 17 from undesirable movements when the tire 11 is being mounted to the wheel 13 as shown in FIG. 1C.

Mounting of the tire 11 to the wheel 13 is accomplished by way of the working assembly 150 and is generally enabled by the motors 12, 14, and 16. According to an embodiment, the working assembly 150 is raised and lowered along the central axis, A-A, by way of the motor 12 and an associated drive linkage 60 that adjusts vertical displacement of the working assembly 150 according to the direction of the arrows, Z, Z'. The motor 14 may be referred to as a radial motor that adjusts horizontal displacement in reference to the central axis, A-A, of the working assembly 150 according to the direction of arrows, X, X'. The motor 16 may be referred to as a rotary motor that adjusts, circumferentially, the installation wheel 38 about the central axis, A-A. The motors 12, 14, and 16 may be any type of motor including, but not limited to an electric motor, a hydraulic motor, a pneumatic motor, or the like. Motors 12, 14 and 16 are preferably controlled by the controller 18. According to the above and following description, the horizontal displacement in reference to the axis, A-A, according to the direction of the arrows, X, X', is substantially perpendicular to and traverses the central axis, A-A.

According to an embodiment, the tire 11 and wheel 13 may be delivered to tire-wheel assembly adjuster 100 and secured to the base portion 15 whereby the tire 11 is stored flatly on top of the wheel 13 in what is commonly referred to as a "mushroom position" (see, e.g., FIGS. 1A, 1B). The working assembly 150 may then be lowered according to the direction of the arrow, Z', to place the working assembly 150 in a tire mounting position, as generally shown in FIG. 1C. Then, the upper spindle 24 cooperatively engages the lower spindle 26 to secure the wheel 13 to cart 17, and also, the wheel 13 with respect to tire-wheel assembly adjuster 100.

In some circumstances, however, as shown in FIG. 1D, the tire 11 may be delivered to tire-wheel assembly adjuster 100 in a canted position relative the wheel 13. This canted positioning of the tire 11 relative the wheel 13 is compared to the so-called "mushroom position," which is shown according to a phantom outline, M, of the tire 11. If the tire 11 is delivered to the working assembly 150 in the canted position, the one or more movable kickers 28, which are also called "kicker arms," can be activated, thereby tipping tire 11 onto the wheel 13 to re-position the tire 11 substantially in the mushroom position, M, relative the wheel 13.

One or more catcher stops 62 may also be positioned generally opposite of the one or more kickers 28. One or more catcher stops 62 are manipulatable along a linear axis by way of a movement mechanism 64. One or more catcher stops 62 are used to move the tire 11 so that the bead portion of tire 11 is properly positioned into the drop center wheel 13. According, these features at 28 and 62 may prepare the tire 11 for mounting to wheel 13 should the tire 11 not be initially positioned in a mushroom position, M.

Referring to FIG. 1C, as illustrated, the ram 30 is mounted to the base platform 32. The ram 30 includes the head 34 which is vertically adjustable according to the direction of the arrows, Z, Z' by the motor 12, drive linkage 60, platform 32, and ram 30. Functionally, the head 34 is used to exert pressure in the direction of arrow, Z', on the carcass of the tire 11 at appropriate times in order to properly position the lower and upper bead of the tire 11 in the drop zone of wheel 13 at the appropriate time during the installation process.

The platen 36 is carried by, and rotated by, the rotary motor 16. The installation wheel 38 is carried by the radial arm 40, which is rotatable 360° about the central axis, A-A. The installation wheel 38 is rotated 360° during installation of the tire 11 onto wheel 13, and, during this 360° rotation, the installation wheel 38 is responsible for exerting the downward force according to the direction of arrow, Z', on the bead seat portion of tire 11, thereby forcing the tire bead to ride over the edge of wheel 13 and into the drop zone portion 66 of the wheel 13.

In addition to being rotatable about the central axis, A-A, the installation wheel 38 is also radially adjustable according to the direction of arrows, X, X'. This radial adjustability according to arrows, X, X', is powered by the radial motor 14. Radial adjustability of the installation wheel 38 according to the arrows, X, X', is used in two ways: firstly, it allows for differently sized wheels 13/tires 11, such as, for example, 14-, 15-, or 16-inch wheels 13/tires 11, to be accommodated by the tire-wheel assembly adjuster 100 simply by radially adjusting the position of installation wheel 38. Secondly, during the 360° installation rotation of the installation wheel 38, it is often desirable to deviate the rotary path of the installation wheel 38 from that of a true, perfect-circle movement to that of a non-circular path (e.g. elliptical). Accordingly, the present invention allows the installation wheel 38 to be radially adjustable while permitting the installation wheel 38 to trace out circular as well as non-circular rotation paths as it rotates about axis, A-A, which will be discussed hereinafter in conjunction with FIGS. 3A-6.

Referring now to FIGS. 3A-6, the sub-assembly 152 of the working assembly 150 is shown according to an embodiment. The sub-assembly 152 generally includes the platen 36 that is connected to the rotary motor 16 either directly or by way of the intermediate transmission mechanism 20. The sub-assembly 152 also includes a shaft 68 that extends from the transmission mechanism 20. The shaft 68 may include a hollow portion 70 whereby an inner shaft 72 may transverse through the hollow portion 70 of shaft 68. As illustrated, the shaft 68, may be attached directly to the platen 36, and, the platen 36 is responsible for translating 360° rotational movement to the installation wheel 38, which is used to install the tire 11 to the wheel 13 as shown in FIG. 1C. The inner shaft 72, however, may be directly driven by the radial motor 14, or, the inner shaft 72 may be indirectly coupled to the radial motor 14 by way of the transmission 22. Unlike the rotary movement imparted by the shaft 68, the inner shaft 72 imparts a linear movement according to the direction of arrows, Z, Z', which is effective for adjusting the radial position according to the direction of arrows, X, X', of the installation wheel 38.

Figure 4:
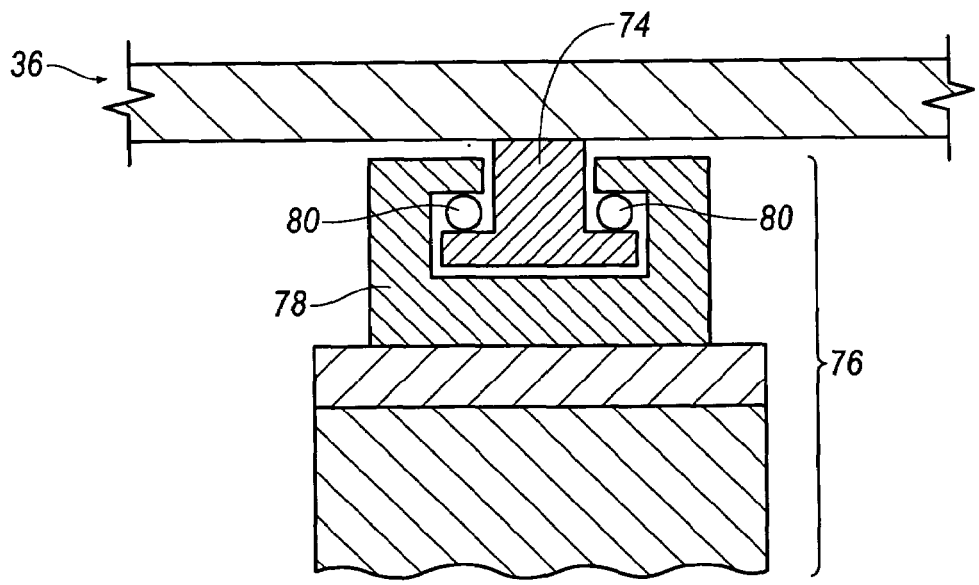
FIG. 4 illustrates a partial cross-sectional view taken substantially through substantially through line 4-4 of FIG. 3A according to an embodiment.

Referring now to FIG. 4, the platen 36 includes a T-shaped rail 74, which is adapted to support a shuttle assembly 76. Shuttle assembly 76 includes, in part, one or more rail engagement members 78, which are supported upon the rail 74 by way of ball bearings 80. The interface of the ball bearings 80 between the one or more rail engagement members 78 and the rail 74 permits the shuttle assembly 76 to slide freely, within limits, in a horizontal orientation according to the direction of arrows, X, X'.

Figure 3A:
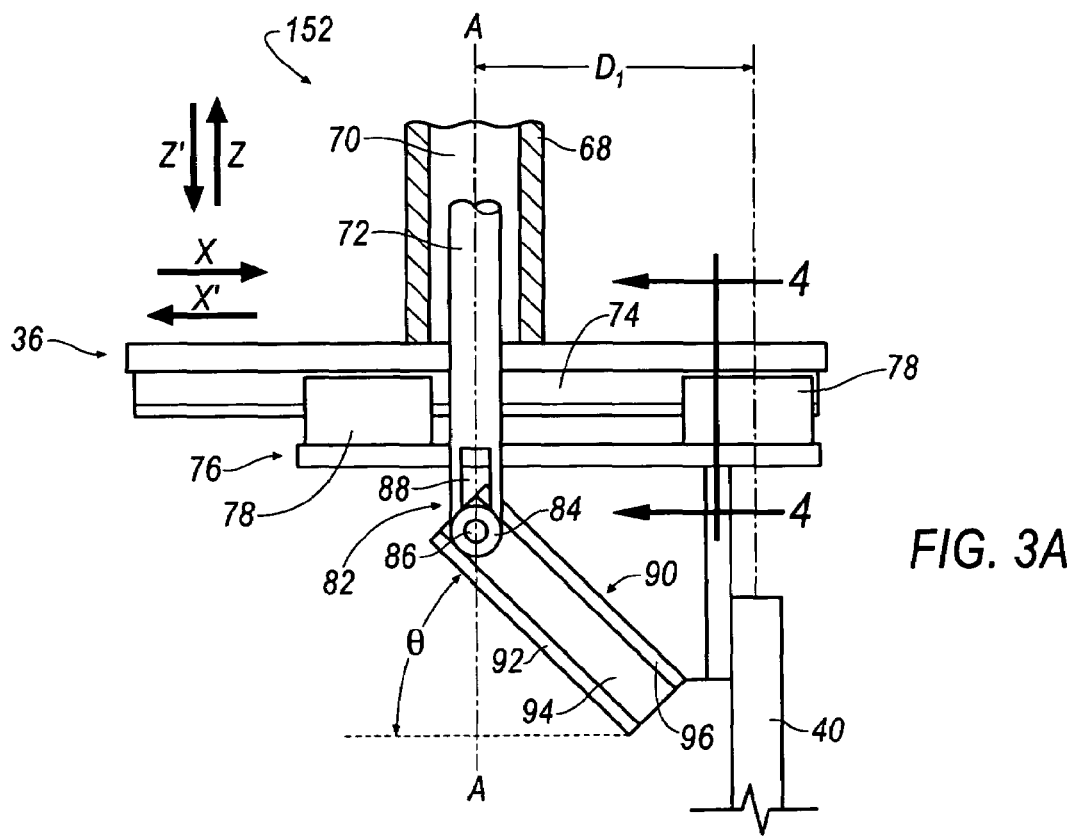
FIG. 3A illustrates a partial front view of a shuttle assembly in a radially-extended position according to an embodiment.
Figure 3B:
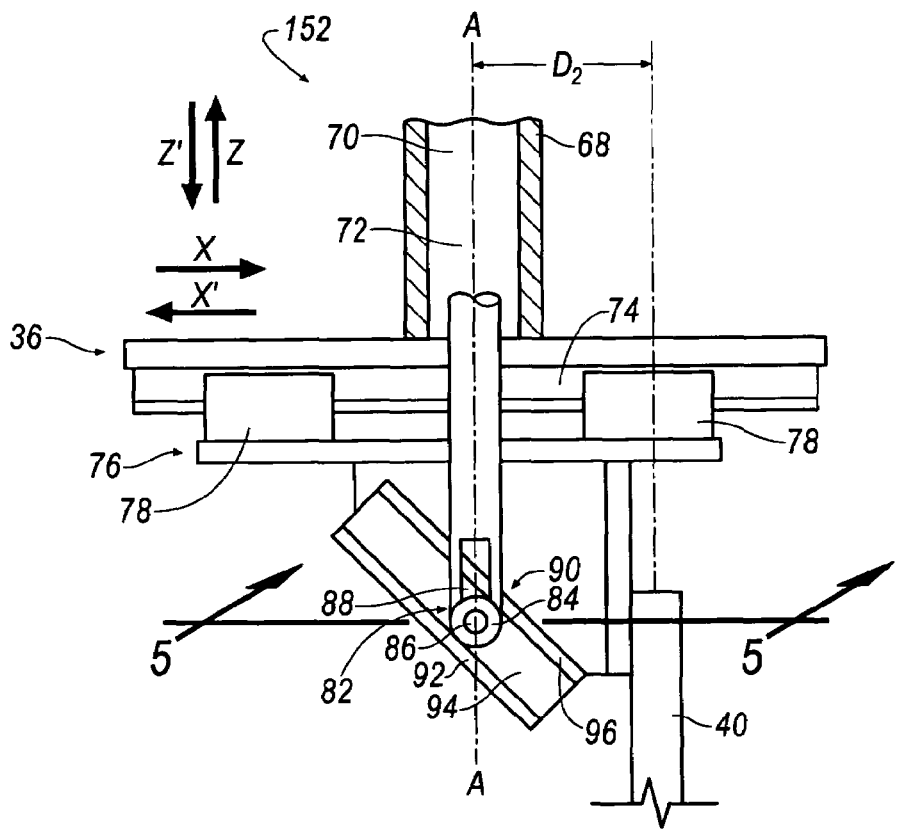
FIG. 3B illustrates a partial front view of a shuttle rail assembly in a radially-intermediate position according to an embodiment.
Figure 3C:
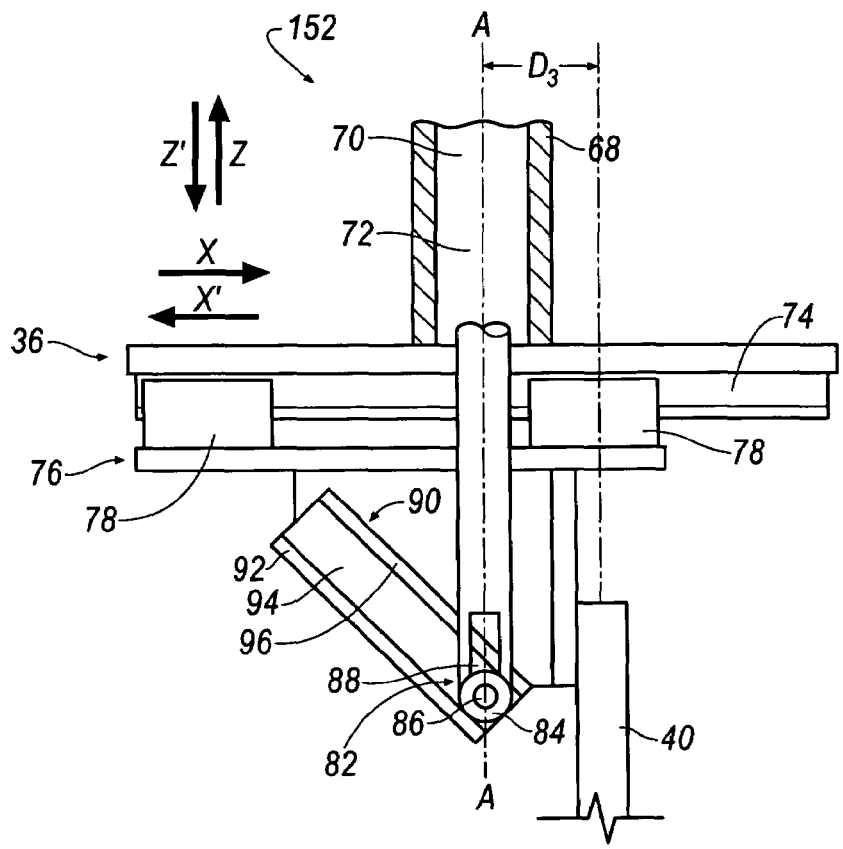
FIG. 3C illustrates a partial front view of a shuttle rail assembly in a radially-retracted position according to an embodiment.

Referring to FIGS. 3A-3C, although the inner shaft 72 is freely movable, within limits, in a vertical linear direction according to arrows, Z, Z', it is restricted from any horizontal movement according to arrows, X, X'. At an end portion 82 of inner shaft 72, one or more wheels 84 are positioned on an axle 86. Axle 86 is captured within a slotted opening 88 formed within the inner shaft 72. As illustrated, the shuttle assembly 76 is fashioned with an angled trough member 90. The angled trough member 90 is firmly secured to shuttle assembly 76 and can be angled at any desired angle, θ, such as, for example, 45°, or the like. The angled trough member 90 forms a U-shaped cross-section which is sized to snuggly capture the wheel 84 while still allowing sufficient clearance between the wheel 84 and the U-shaped cross-section to permit the wheel 84 to freely roll within angled trough member 90.

When it is desired to radially shorten the positioning of the installation wheel 38 relative the central axis, A-A, the controller 18 receives a command signal from, for example, an operator, sensor, or the like and activates the motor 14 such that shaft 72 is lowered. The lowering of shaft 72 causes the wheel 84 to exert a downward force according to the direction of the arrow, Z', on a bottom member 92 of angled trough member 90. In reaction to this downward force, the angled trough member 90 moves horizontally according to the direction of the arrow, X', from a radially extended position (FIG. 3A) to a radially intermediate position (FIG. 3B). The radially extended position may accommodate, for example, the mounting of a tire 11 onto a 16-inch wheel 13 and the radially intermediate position may accommodate, for example, the mounting of a tire 11 onto a 15-inch wheel 13.

When positioned as shown in FIG. 3B, if another downward force is applied according to the direction of the arrow, Z', on the bottom member 92 by the wheel 84, the angled trough member 90 is moved horizontally according to the direction of the arrow, X', from the radially intermediate position of FIG. 3B to a radially retracted position (FIG. 3C). The radially retracted position may accommodate, for example, the mounting of a tire 11 onto a 14-inch wheel 13. Accordingly, it will be appreciated that the radially extended positioning of the installation wheel 38 may accommodate the mounting of a tire 11 to a wheel 13 that is greater, in diameter, than that of a wheel 13 corroborating to the radially intermediate position, which is greater than that of a wheel's diameter when the installation wheel 38 is situated in a radially retracted positioning.

Thus, the angled trough member 90 is effective for translating the vertical movement of the inner shaft 72 into a horizontal movement according to the direction of arrows, X, X'. Because the radial arm 40 is attached to the shuttle 76, movement of the shuttle 76 in the direction according to the arrow, X', in effect, decreases a radial positioning of the installation wheel 38 from a first distance, $D_1$ (FIG. 3A), to one or more second distances, $D_2$, $D_3$ (FIGS. 3B, 3C), in reference to the central axis, A-A. Conversely, when the shuttle 76 is moved from the one or more second distances, $D_2$, $D_3$, to the first distance, $D_1$, according to the direction of the arrow, X, the radial positioning of the installation wheel 38, relative the central axis, A-A, is increased. It is also easily understood from the above description that, in addition to circular patterns, the installation wheel 38 can be made to trace out non-circular rotational patterns during its 360° traversal by simply oscillating the movement of the inner shaft 72 according to the direction of the arrows, Z, Z', during the 360° of rotation of the platen 36.

Figure 5:
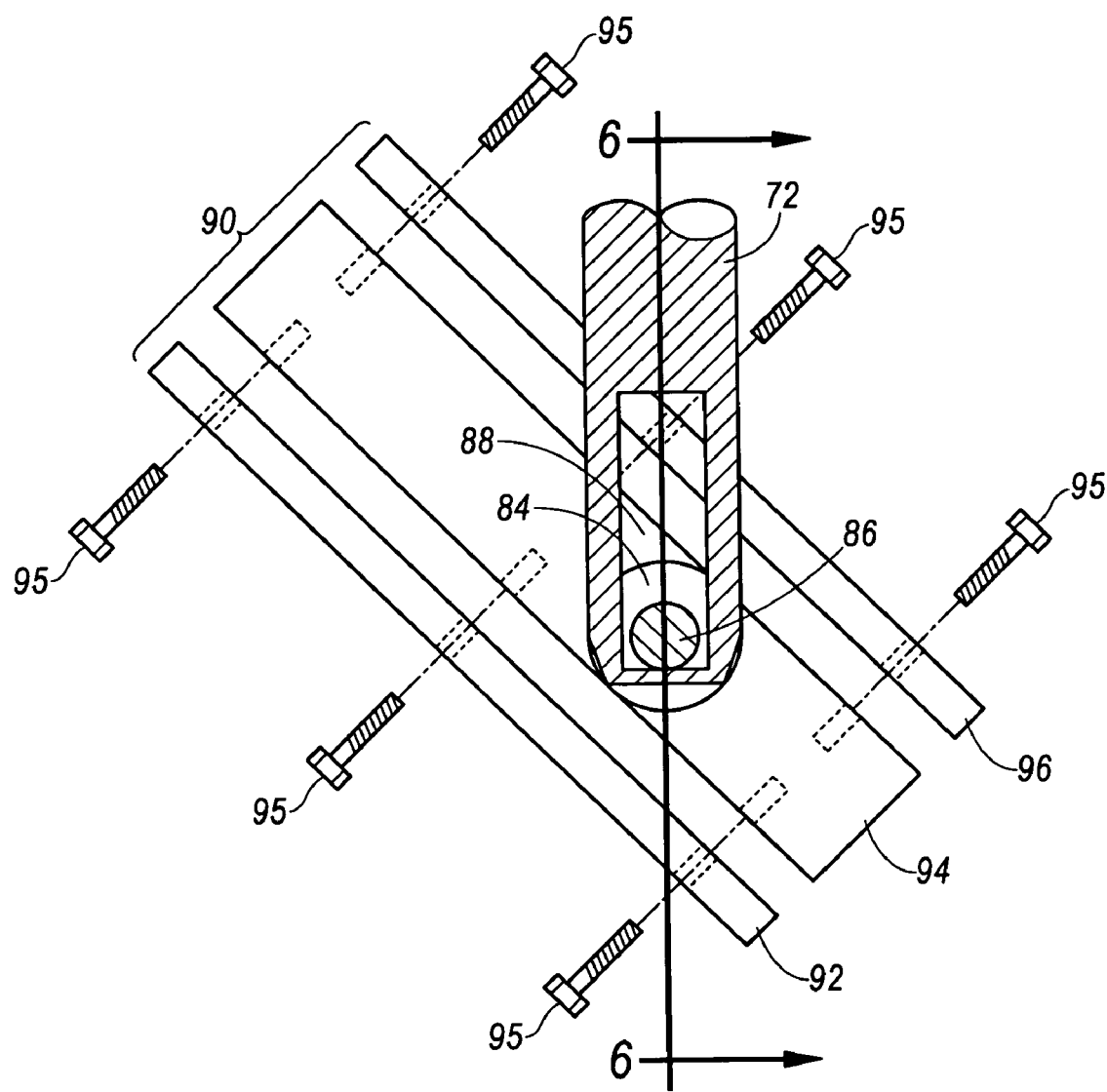
FIG. 5 illustrates a partial cross-sectional view taken substantially through line 5-5 of FIG. 3B according to an embodiment.
Figure 6:
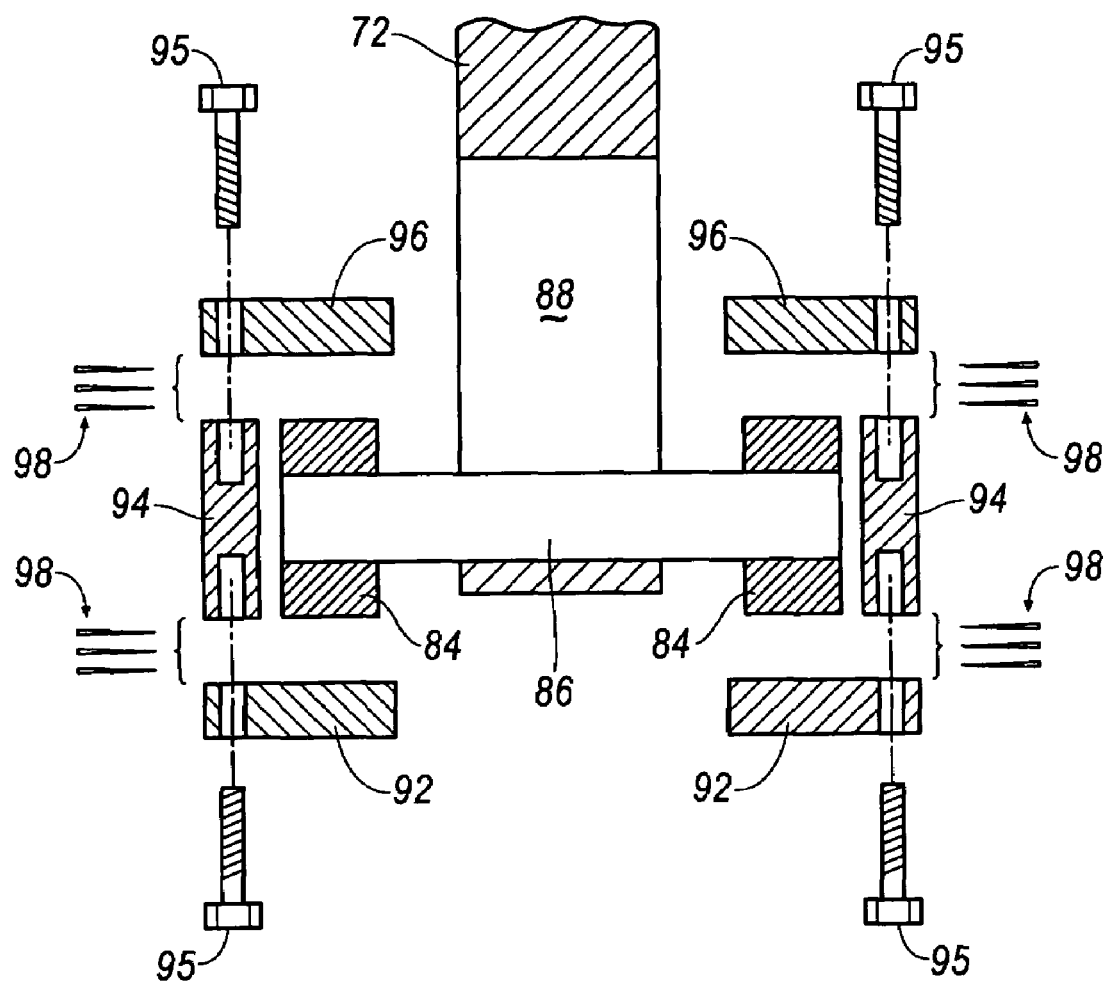
FIG. 6 illustrates a cross-sectional view taken substantially through line 6-6 of FIG. 5 according to an embodiment.

Now referring to FIGS. 5 and 6, the angled trough 90 is securely fastened to shuttle 76 using any conventional means of fastening, such as, for example, welding, threaded fasteners 95, rivets, or the like. The angled trough 90 is preferably fabricated from members 92, 94, 96 such that there is very little clearance between wheel 84 and the bottom and top members 92, 96 (i.e., after members 92, 94, and 96 have been joined together). By eliminating any extraneous clearance between wheel 84 and the trough members 92, 96, a slide mechanism is created having very little, or no perceivable, backlash during operation. In order to obtain the proper clearance between the members 92, 96, one or more members 92, 94, 96 may be precision ground to size or one or more shim members 98 (FIG. 6) may be placed between at least one of the ends of the intermediate trough member 94 and at least one of the bottom trough member 92 or top trough member 96.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A tire-wheel assembly adjuster that adaptably-adjusts a mounting configuration to variably accommodate a particular size/dimension of a workpiece supported by a cart having a pin extending from an upper support surface of the cart, wherein the workpiece includes a tire and a wheel, comprising:
   a body;
   a working assembly coupled to the body;
   a shuttle assembly movably-coupled to the working assembly, wherein the working assembly includes
      a sub-assembly having one or more components; and
      means for axially-adjusting, along a first axis, at least a first component of the one or more components of the sub-assembly relative the body, wherein the shuttle assembly is connected to the at least a first component of the one or more components of the sub-assembly to provide
         means for radially adjusting the shuttle assembly with respect to said first axis in response to an axial adjustment of the at least a first component of the one or more components of the sub-assembly.

2. The tire-wheel assembly adjuster according to claim 1, wherein the means for axially-adjusting the at least a first component of the one or more components of the sub-assembly relative to the body includes
   a motor.

3. The tire-wheel assembly adjuster according to claim 1, wherein the one or more components of the sub-assembly includes
   a platen including a rail, wherein the shuttle assembly includes a rail engagement member, wherein the rail engagement member is slidably-supported by the rail.

4. The tire-wheel assembly adjuster according to claim 3, wherein the shuttle assembly includes
   a radial arm including an installation wheel, wherein the installation wheel defines
      means for mounting the tire to the wheel by locating a bead of the tire into a bead seat of the wheel.

5. The tire-wheel assembly adjuster according to claim 3, wherein the shuttle assembly includes
   an angled trough member, wherein the at least a first component of the one or more components of the sub-assembly that is axially adjustable by the means for axially adjusting includes
      a shaft having an end including an axle and a wheel member, wherein the angled trough member is slidably supported by the wheel member, wherein the angled trough member is radially adjustable in response to the axial adjustment of the shaft by the means for axially adjusting for radially adjusting the shuttle assembly.

6. The tire-wheel assembly adjuster according to claim 5, wherein the angled trough member includes a first member, a second member, and a third member joined by one or more fasteners.

7. The tire-wheel assembly adjuster according to claim 6 further comprising
   shims located between the first member and the second member and/or the second member and the third member.

8. The tire-wheel assembly adjuster according to claim 1 further comprising
   a motor connected to the sub-assembly, wherein the motor defines
      means for providing circumferential movement of the one or more sub-assembly components about an axis extending through the workpiece.

9. The tire-wheel assembly adjuster according to claim 1, wherein the body includes
   a gripping claw,
   wherein the pin extending from the upper support surface of the cart interfaces with the gripping claw.

10. The tire-wheel assembly adjuster according to claim 9, further comprising
    a first ram extending from the body, and
    a second ram extending from the body, wherein each of the first and second rams include a wedge portion that is disposable underneath a rear side of the support surface such that a top surface of the wedge portions engage the rear side, wherein the first and second rams define
       means for raising the cart from a support surface.

11. A tire-wheel assembly adjuster that adaptably-adjusts a mounting configuration to variably accommodate a particular size/dimension of a workpiece, wherein the workpiece includes a tire and a wheel, comprising:
    a body; and
    a working assembly coupled to the body, wherein the working assembly includes a sub-assembly including
       a shaft,
       an axle and a wheel member disposed at an end of the shaft,
       wherein the sub-assembly is connected to
          a shuttle assembly having a coupling member, wherein the coupling member is slidably-coupled to the shaft, wherein the coupling member is slidably supported by the wheel member.

12. The tire-wheel assembly adjuster according to claim 11, wherein the shaft defines:
    means for radially-adjusting a positioning of the shuttle assembly relative an axis extending along the shaft in response to axial movement of the shaft along the axis.

13. The tire-wheel assembly adjuster according to claim 12, wherein the coupling member is arranged in an angularly offset orientation at an angle relative the axis extending along the shaft.

14. The tire-wheel assembly adjuster according to claim 13, wherein the coupling member defines:
    means for translating the axial movement of the shaft into radial movement of the shuttle assembly relative the axis.

15. The tire-wheel assembly adjuster according to claim 12, further comprising a motor connected to the shaft, wherein the motor defines:
    means for axially-moving the shaft along the axis.

16. The tire-wheel assembly adjuster according to claim 11, wherein the sub-assembly includes:
    a platen including a rail, wherein the shuttle assembly includes a rail engagement member, wherein the rail engagement member is slidably-supported by the rail.

17. The tire-wheel assembly adjuster according to claim 16, wherein the shuttle assembly includes:
    a radial arm including an installation wheel, wherein the installation wheel defines
       means for mounting the tire to the wheel by locating a bead of the tire into a bead seat of the wheel.

18. The tire-wheel assembly adjuster according to claim 17, further comprising:
    a motor connected to the sub-assembly, wherein the motor defines
       means for providing circumferential movement of the installation wheel.

19. A tire-wheel assembly adjuster that adaptably-adjusts a mounting configuration to variably accommodate a particular size/dimension of a workpiece, wherein the workpiece includes a tire and a wheel, comprising:
    a cart including
       a protrusion;
    a body removably-interfaced with the cart, wherein the body includes
       a interfacing portion that is selectively-coupled to the protrusion;
    a working assembly coupled to the body, wherein the working assembly includes a sub-assembly; and
    one or more rams extending from the body, wherein the one or more rams include a wedge portion, wherein the wedge portion is selectively disposable adjacent a lower surface of a support member of the cart.

20. The tire-wheel assembly adjuster according to claim 19, wherein the support member further includes an upper surface.

21. The tire-wheel assembly adjuster according to claim 19, wherein the one or more rams define:
    means for axially raising the cart from a surface that supports the cart.

22. The tire-wheel assembly adjuster according to claim 20, wherein the protrusion defines:
    a pin extending from the upper surface, wherein the interfacing portion includes
       a gripping claw.

23. The tire-wheel assembly adjuster according to claim 19, further comprising
a shuttle assembly, wherein the cart supports one or more of the tire and wheel, wherein the shuttle assembly is interfaceable with one or more of the tire and wheel.

24. The tire-wheel assembly adjuster according to claim 23, wherein the working assembly includes:
a shaft, wherein the shuttle assembly includes a coupling member, wherein the coupling member is slidably-coupled to the shaft.

25. The tire-wheel assembly adjuster according to claim 24, wherein the shaft defines:
means for radially-adjusting a positioning of the shuttle assembly relative an axis extending along the shaft in response to axial movement of the shaft along the axis.

26. The tire-wheel assembly adjuster according to claim 25, wherein the coupling member is arranged in an angularly offset orientation at an angle relative the axis extending along the shaft.

27. The tire-wheel assembly adjuster according to claim 26, wherein the coupling member defines:
means for translating the axial movement of the shaft into radial movement of the shuttle assembly relative the axis.

28. A tire-wheel assembly adjuster that adaptably-adjusts a mounting configuration to variably accommodate a particular size/dimension of a workpiece, wherein the workpiece includes a tire and a wheel, comprising:
a body;
a working assembly coupled to the body, wherein the working assembly includes a sub-assembly including
a shaft, and
a platen including a rail, wherein the sub-assembly is connected to
a shuttle assembly having a coupling member, wherein the coupling member is slidably-coupled to the shaft, wherein the shuttle assembly includes a rail engagement member, wherein the rail engagement member is slidably-supported by the rail of the platen.

29. The tire-wheel assembly adjuster according to claim 28, wherein the shuttle assembly includes:
a radial arm including an installation wheel, wherein the installation wheel defines
means for mounting the tire to the wheel by locating a bead of the tire into a bead seat of the wheel.

30. The tire-wheel assembly adjuster according to claim 29, further comprising:
a motor connected to the sub-assembly, wherein the motor defines
means for providing circumferential movement of the installation wheel.

31. A tire-wheel assembly adjuster that adaptably-adjusts a mounting configuration to variably accommodate a particular size/dimension of a workpiece, wherein the workpiece includes a tire and a wheel, comprising:
a cart including
a protrusion, and
a support member defining an upper surface and a lower surface, wherein the protrusion defines a pin extending from the upper surface;
a body removably-interfaced with the cart, wherein the body includes
a interfacing portion that is selectively-coupled to the protrusion, wherein the interfacing portion includes a gripping claw;
a working assembly coupled to the body, wherein the working assembly includes a sub-assembly.

* * * * *